United States Patent
Xu et al.

(10) Patent No.: US 11,184,279 B2
(45) Date of Patent: Nov. 23, 2021

(54) BUILDING DECISION TREE FOR PACKET CLASSIFICATION

(71) Applicant: New H3C Technologies Co., Ltd., Zhejiang (CN)

(72) Inventors: Dawei Xu, Beijing (CN); Kai Ren, Beijing (CN); Changzhong Ge, Beijing (CN)

(73) Assignee: New H3C Technologies Co., Ltd., Zhejiang (CN)

( * ) Notice: Subject to any disclaimer, the term of this patent is extended or adjusted under 35 U.S.C. 154(b) by 0 days.

(21) Appl. No.: 16/643,484

(22) PCT Filed: Aug. 29, 2018

(86) PCT No.: PCT/CN2018/102845
§ 371 (c)(1),
(2) Date: Feb. 28, 2020

(87) PCT Pub. No.: WO2019/042305
PCT Pub. Date: Mar. 7, 2019

(65) Prior Publication Data
US 2020/0195552 A1 Jun. 18, 2020

(30) Foreign Application Priority Data
Aug. 31, 2017 (CN) .......................... 201710771899.0

(51) Int. Cl.
*H04L 12/753* (2013.01)
*G06K 9/62* (2006.01)
(Continued)

(52) U.S. Cl.
CPC ............ *H04L 45/48* (2013.01); *G06K 9/6282* (2013.01); *H04L 45/08* (2013.01); *H04L 69/22* (2013.01)

(58) Field of Classification Search
None
See application file for complete search history.

(56) References Cited

U.S. PATENT DOCUMENTS

| 9,595,003 | B1 | 3/2017 | Bullis et al. |
| 2007/0056038 | A1 | 3/2007 | Lok |

(Continued)

FOREIGN PATENT DOCUMENTS

| CN | 101478551 A | 7/2009 |
| CN | 102281196 A | 12/2011 |

(Continued)

OTHER PUBLICATIONS

Gupta, P. et al., "Packet Classification using Hierarchical Intelligent Cuttings," Standford University Website, Available Online at http://yuba.stanford.edu/~nickm/papers/HOTI_99.pdf, Available as Early as Jan. 2000, 9 pages.

(Continued)

*Primary Examiner* — Anh Ngoc M Nguyen
(74) *Attorney, Agent, or Firm* — McCoy Russell LLP

(57) ABSTRACT

A method and an apparatus for building a decision tree for packet classification are provided. According to an example of the present disclosure, a first type decision tree is generated by performing tree building for a classification rule set based on a non-template dimension of the classification rule set; a second type decision tree is generated by performing tree building for each leaf node in the first type decision tree based on a template dimension of the classification rule set; a plurality of leaf nodes that are mutually of the to each other in the first type decision tree are associated with a same second type decision tree. The plurality of leaf nodes that are SPSR to each other indicate that classification rule sets respectively included in the plurality of leaf nodes are SPSR to each other.

11 Claims, 8 Drawing Sheets

(51) Int. Cl.
*H04L 12/751* (2013.01)
*H04L 29/06* (2006.01)

(56) References Cited

U.S. PATENT DOCUMENTS

| | | | |
|---|---|---|---|
| 2010/0192215 | A1 | 7/2010 | Yaxuan et al. |
| 2013/0085978 | A1 | 4/2013 | Goyal et al. |
| 2013/0097205 | A1* | 4/2013 | Kong .................. G06F 16/9027 707/797 |
| 2016/0269511 | A1* | 9/2016 | Guo .................... H04L 47/2441 |
| 2018/0302335 | A1* | 10/2018 | Gao .................... H04L 43/0876 |

FOREIGN PATENT DOCUMENTS

| | | |
|---|---|---|
| CN | 103858386 A | 6/2014 |
| CN | 102255788 B | 8/2014 |
| CN | 104579941 A | 4/2015 |
| CN | 105354588 A | 2/2016 |
| CN | 106209614 A | 12/2016 |

OTHER PUBLICATIONS

Singh, S. et al., "Packet Classification Using Multidimensional Cutting," Proceedings of the 2003 Conference on Applications, Technologies, Architectures, and Protocols for Computer Communications (SIGCOMM'03), Aug. 25, 2003, Karlsruhe, Germany, 12 pages.

Qi, Y. et al., "Packet Classification Algorithms: From Theory to Practice," Proceedings of IEEE Infocom 2009, Apr. 19, 2009, Rio de Janeiro, Brazil, 9 pages.

Qi, Y. et al., "Multi-dimensional Packet Classification on FPGA: 100 Gbps and Beyond," Proceedings of the 2010 International Conference on Field-Programmable Technology, Dec. 8, 2010, Beijing, China, 8 pages.

Ma, T. et al., "Multi decision-tree packet classification algorithm based on rule set partitioning," Journal of Computer Applications, vol. 33, No. 9, Sep. 1, 2013, 5 pages. (Submitted with English Abstract).

ISA State Intellectual Property Office of the People's Republic of China, International Search Report Issued in Application No. PCT/CN2018/102845, dated Nov. 1, 2018, WIPO, 4 pages.

State Intellectual Property Office of the People's Republic of China, Office Action and Search Report Issued in Application No. 201710771899.0, dated Dec. 26, 2019, 9 pages. (Submitted with Partial Translation).

ISA State Intellectual Property Office of the People's Republic of China, Written Opinion of the International Searching Authority Issued in Application No. PCT/CN2018/102845, dated Nov. 1, 2018, WIPO, 8 pages.

European Patent Office, Extended European Search Report Issued in Application No. 18851181.0, dated Apr. 21, 2020, Germany, 10 pages.

Japanese Patent Office, Office Action Issued in Application No. 2020-512410, dated Mar. 30, 2021, 8 pages. (Submitted with Machine Translation).

European Patent Office, Office Action Issued in Application No. 18851181.0, dated Aug. 20, 2021, Netherlands, 7 pages.

* cited by examiner

BUILDING DECISION TREE FOR PACKET CLASSIFICATION

CROSS REFERENCE TO RELATED APPLICATIONS

The present application is a U.S. National Phase of International Application No. PCT/CN2018/102845, entitled "BUILDING DECISION TREE FOR PACKET CLASSIFICATION", and filed on Aug. 29, 2018. International Application No. PCT/CN2018/102845 claims priority to Chinese Patent Application No. 201710771899.0 entitled "METHOD AND APPARATUS FOR BUILDING DECISION TREE FOR PACKET CLASSIFICATION" filed on Aug. 31, 2017. The entire contents of each of the above-listed applications are hereby incorporated by reference for all purposes.

BACKGROUND

Packet classification refers to that a matched classification rule with highest priority is obtained by querying preconfigured classification rules based on values of different fields in a packet header of a packet to perform an operation configured for the obtained classification rule. Many functions such as access control, flow control, load balance or intrusion detection provided by a network device may use a packet classification.

A multi-domain division algorithm based on decision tree is a typical packet classification method. The basic idea of the typical packet classification method is to recursively divide an entire multi-dimension space into sub-spaces. An ending condition of recursion is that all rules contained in a current sub-space fill up the sub-space in different dimensions. Through this process, a decision tree may be obtained. For each packet to be classified, a classification rule matching the packet may be obtained by querying the decision tree for the packet.

By practice, it is discovered that a decision tree will occupy more storage space when the decision tree has more nodes. However, a storage space of a network device is limited. An excessive number of nodes of the decision tree will restrict a scale of a classification rule set supported by a packet classification algorithm. Therefore, how to reduce a number of nodes of a decision tree without affecting an efficiency of querying the decision tree becomes an urgent technical problem to be solved.

DETAILED DESCRIPTION OF THE EMBODIMENTS

Figure 1:
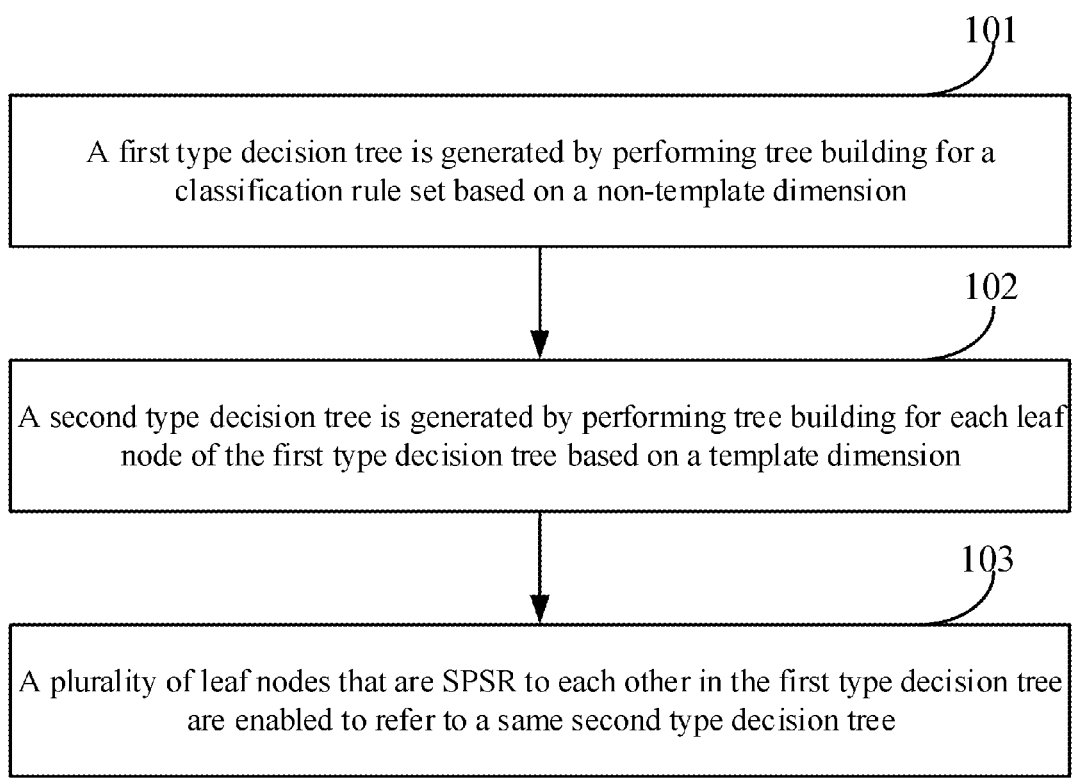
FIG. 1 is a flowchart schematically illustrating a method of building a decision tree for packet classification according to an example of the present disclosure.

To enable persons skilled in the art to better understand the technical solutions of examples of the present disclosure, brief descriptions for part of concepts involved in the technical solutions of examples of the present disclosure are firstly made below.

A classification rule set includes a plurality of classification rules, where one classification rule includes dimension information and priority.

Each piece of dimension information is indicated by a value range. When a classification rule is matched, a matching result is returned. When there is a plurality of rules satisfying a matching condition, it is determined by Priority of which rule the matching result is to be returned. In an example of the present disclosure, a matching result of a classification rule with highest priority is returned as an example. A format of a classification rule set may be shown as Table 1. The classification rule set in table 1 includes 9 classification rules, i.e., r0-r8.

TABLE 1

|  | Priority | sip | dip | sport | dport | prot | vlan | sysport |
|---|---|---|---|---|---|---|---|---|
| r0 | 5 | * | * | * | 80 | tcp | * | 0x200 |
| r1 | 10 | * | * | >=12000 | * | tcp | * | 0x200 |
| r2 | 15 | * | 10.1.1.x | >=10000 | >=10000 | udp | * | 0x200 |
| r3 | 6 | * | * | * | 80 | tcp | [10, 20] | 0x300 |
| r4 | 11 | * | * | >=12000 | * | tcp | [10, 20] | 0x300 |
| r5 | 16 | * | 10.1.1.x | >=10000 | >=10000 | udp | [10, 20] | 0x300 |
| r6 | 7 | * | * | * | 80 | tcp | 30 | * |
| r7 | 12 | * | * | >=12000 | * | tcp | 30 | * |
| r8 | 17 | * | 10.1.1.x | >=10000 | >=10000 | udp | 30 | * |

The dimension information of classification rules shown in Table 1 includes a source IP address (sip), a destination IP address (dip), a source port number (sport), a destination port number (dport), a protocol type (prot), Virtual Local Area Network (vlan) and a system port (sysport). The dimension information prot may include but is not limited to Transmission Control Protocol (tcp) or User Datagram Protocol (udp) and so on. When a value of dimension information is "*", it indicates that the value of the dimension information may be any value within a value range of the dimension information. For example, a value range of the dimension information dport is $0\sim(2^{16}-1)$.

A classification rule template is a set of template items. One classification rule template may include one or more template items.

A template item includes one or more pieces of dimension information. A format of a classification rule template including three template items may be shown in Table 2 below.

TABLE 2

| index | priority | sip | dip | sport | dport | prot |
|---|---|---|---|---|---|---|
| me0 | 5 | * | * | * | 80 | tcp |
| me1 | 10 | * | * | >=12000 | * | tcp |
| me2 | 15 | * | 10.1.1.x | >=10000 | >=10000 | udp |

A template dimension is a dimension included in a template item. For example, with Table 1 and Table 2 as an example, a template item shown in Table 2 includes five template dimensions, i.e. sip, dip, sport, dport and prot in a classification rule.

A non-template dimension is a dimension other than template dimensions in a classification rule. For example, still taking Table 1 and Table 2 as an example, a classification rule shown in Table 1 includes two non-template dimensions, i.e. vlan and sysport.

Template instantiation refers to applying a classification rule template to one or more non-template dimensions such that one or more classification rules are obtained.

For example, classification rules r0, r1 and r2 in the classification rule set shown in Table 1 may be obtained by applying the classification rule template shown in Table 2 to the non-template dimension sysport=0x200. The values of the template dimensions sip, dip, sport, dport and prot in the three classification rules correspond to the values of corresponding template dimensions in the classification rule template shown in Table 2 respectively, and the values of the non-template dimension sysport are all 0x200.

In template instantiation, a plurality of non-template dimensions may be assigned for instantiation. For example, classification rules r3, r4, r5 in the classification rule set shown in Table 1 may be obtained by applying the classification rule template shown in Table 2 to the non-template dimensions vlan=[10,20) and sysport=0x300.

{r0, r1, r2}, {r3, r4, r5} and {r6, r7, r8} may be referred to as classification rule subsets in the classification rule set shown in Table 1.

A hole-filling rule (fb_rule) is a classification rule with the values of all dimensions being "*". The hole-filling rule is a classification rule with lowest priority. In other words, priorities of different classification rules included in the classification rule set are higher than the priority of the hole-filling rule.

For a plurality of classification rule subsets obtained by applying one classification rule template to a plurality of different non-template dimensions, the relationship between every two of them is named as Same Pattern Sub Ruleset (SPSR). One classification rule template may be applied to a plurality of different non-template dimensions, which is referred to as instantiations with respect to different non-template dimensions.

For example, in the classification rule set shown in Table 1, the classification rule subsets {r0, r1, r2}, {r3, r4, r5} and {r6, r7, r8} are SPSR to each other. The hole-filling rule and itself are SPSR to each other.

An SPSR group includes a plurality of classification rule subsets that are SPSR to each other.

An SPSR group corresponding to the hole-filling rule only includes one classification rule, i.e. the hole-filling rule.

To enable the above object, features and advantages of the examples of the present disclosure to be more apparent and easily understood, a technical solution of an example of the present disclosure will be detailed below in combination with accompanying drawings.

FIG. 1 is a flowchart schematically illustrating a method of building a decision tree for packet classification according to an example of the present disclosure. The method of building a decision tree for packet classification may be applied to a network device. The network device may include but is not limited to a switch, and a router and the like. As shown in FIG. 1, the method of building a decision tree for packet classification may include blocks as follows:

Block 101: a first type decision tree is generated by tree building for a classification rule set based on a non-template dimension of the classification rule set, where the first type decision tree refers to a decision tree generated from the classification rule set corresponding to the non-template dimension.

In an example of the present disclosure, the classification rule set does not specify a fixed classification rule set, but refers to any classification rule set used for packet classification, which will not be repeated hereinafter.

In an example of the present disclosure, when a decision tree for packet classification is to be built for a classification rule set, firstly, a decision tree (referred to the first type decision tree or a non-template dimension decision tree) corresponding to a non-template dimension of the classification rule set is to be generated by tree building for the classification rule set based on the non-template dimension of the classification rule set.

For convenience of understanding, descriptions are made below with the first type decision tree as the non-template dimension decision tree.

In an example of the present disclosure, the network device may perform tree building for the classification rule set based on space division.

The specific implementation of performing tree building for a classification rule set by a network device based on a non-template dimension of the classification rule set will be described below in combination of examples, which will not be repeated herein.

It is noted that in an example of the present disclosure, when a network device performs tree building for a classification rule set based on a non-template dimension of the classification rule set, if no classification rule in the classification rule set is matched based on the selected dimension and its value, the network device may set a classification rule which is included in a leaf node having no classification rule matched, as a hole-filling rule. When a sub-space obtained by space division only includes the hole-filling rule, and does not include any other classification rules, an ending condition is satisfied.

Block 102: a second type decision tree is generated by performing tree building for each leaf node of the first type decision tree based on a template dimension of the classification rule set, where the second type decision tree is a decision tree of the template dimension corresponding to the leaf node of the first type decision tree.

In an example of the present disclosure, since the non-template dimension decision tree performs space division for the classification rules in the classification rule set only based on the non-template dimension and each leaf node of the non-template dimension decision tree does not complete space division, it is also desired to perform further space division based on the template dimension.

Correspondingly, after building the non-template dimension decision tree corresponding to the classification rule set, the network device is further to perform space division for each leaf node of the non-template dimension decision tree based on the template dimension of the classification rule set, to obtain a decision tree of a template dimension corresponding to each leaf node of the non-template dimension decision tree (referred to the second type decision tree or a template dimension decision tree).

For ease of understanding, descriptions will be made below with the second type decision tree as the template dimension decision tree.

Since the template dimension decision tree is obtained by performing space division for the leaf node of the non-template dimension decision tree, the template dimension decision tree may be referred to as a sub-tree of the non-template dimension decision tree.

The specific implementation of performing tree building for the leaf node of the non-template dimension decision tree by the network device based on the template dimension of the classification rule set will be described below in combination with specific examples, which will not be repeated herein.

It is noted that, in an example of the present disclosure, since a value of each dimension of the hole-filling rule is "*", that is, any value within a value range of each dimension, what is obtained by performing space division for the hole-filling rule based on a template dimension is still the hole-filling rule. Correspondingly, for the leaf node with a classification rule as the hole-filling rule in the non-template dimension decision tree, a template dimension decision tree obtained by performing space division based on the template dimension is still the hole-filling rule.

Block 103: a plurality of leaf nodes that are SPSR to each other in the first type decision tree are associated with a same second type decision tree.

In an example of the present disclosure, values of template dimensions included in a plurality of classification rule subsets that are SPSR to each other are same. In this way, when a decision tree is built for each of the plurality of classification rule subsets that are SPSR to each other based on a template dimension by using a same algorithm, a plurality of template dimension decision trees are obtained, and the obtained templates dimension decision trees are the same in tree structure except for leaf nodes. Thus, the template dimension decision trees corresponding to the plurality of classification rule subsets that are SPSR to each other may be multiplexed as a same template dimension decision tree.

Correspondingly, after building a template dimension decision tree corresponding to each leaf node of a non-template dimension decision tree, the network device may multiplex the template dimension decision trees in such a way that a plurality of leaf nodes that are SPSR to each other in the non-template dimension decision tree refer to a same template dimension decision tree, thereby reducing a number of template dimension decision trees and further reducing a number of nodes of a decision tree corresponding to a classification rule set. The plurality of leaf nodes that are SPSR to each other indicate that classification rule subsets corresponding to the plurality of leaf nodes respectively are SPSR to each other. A classification rule subset corresponding to a leaf node associate with a set of classification rules included in the leaf node. A decision tree corresponding to a classification rule set includes a non-template dimension decision tree and a template dimension decision tree.

In an example, associating a plurality of leaf nodes that are SPSR to each other in the first type decision tree with a same second type decision tree as above may include: dividing a plurality of different classification rule subsets that are SPSR to each other to a same SPSR group; establishing a mapping relationship among each leaf node of the plurality of leaf nodes that are SPSR to each other in the first type decision tree, an identifier of an SPSR group to which a classification rule subset corresponding to the leaf node belongs, and an index of the classification rule subset in the SPSR group; combining second type decision trees respectively corresponding to the plurality of leaf nodes that are SPSR to each other in the first type decision tree into a same second type decision tree. In this way, leaf nodes of the second type decision tree obtained by combination include classification rule subsets corresponding to different indexes in the SPSR group. The classification rule subset corresponding to the leaf node is a set of classification rules included in the leaf node.

In this example, a plurality of classification rule subsets obtained by performing instantiation by applying a same classification rule template to different non-template dimensions are SPSR to each other and the plurality of classification rule subsets that are SPSR to each other form an SPSR group.

With the classification rule set shown in Table 1 as an example, the classification rule subset {r0, r1, r2} is obtained by applying the classification rule template shown in Table 2 to the non-template dimension sysport=0x200; the classification rule subset {r3, r4, r5} is obtained by applying the classification rule template shown in Table 2 to the non-template dimensions vlan=[10, 20) and sysport=0x300; the classification rule subset {r6, r7, r8} is obtained by applying the classification rule template shown in Table 2 to the non-template dimension vlan=30. Thus, the classification rule subsets {r0, r1, r2}, {r3, r4, r5} and {r6, r7, r8} are SPSR to each other and form one SPSR group.

In this example, an index of each classification rule subset in the SPSR group may be set. In this way, a corresponding classification rule subset may be determined based on an identifier of a SPSR group (for example, the name of the SPSR group) and an index in the SPSR group.

For example, if the classification rule subsets {r0, r1, r2}, {r3, r4, r5} and {r6, r7, r8} belong to an SPSR group spsrg1 (the identifier of the SPSR group is spsrg1) and the indexes of classification rule subsets {r0, r1, r2}, {r3, r4, r5} and {r6, r7, r8} in the SPSR group spsrg1 are 0, 1 and 2 respectively, the classification rule subset {r0, r1, r2} is mapped to the index 0 of the SPSR group spsrg1, the classification rule subset{r3, r4, r5} is mapped to the index 1 of the SPSR group spsrg1 and the classification rule subset{r6, r7, r8} is mapped to the index 2 of the SPSR group spsrg1.

In this example, after determining an SPSR group to which the classification rule subsets belong and indexes of the classification rule subsets in the SPSR group, the network device may establish a mapping relationship among the leaf nodes that are SPSR to each other in a non-template dimension decision tree, an identifier of the SPSR group to which classification rule subsets respectively corresponding to the leaf modes belong, and the indexes of the classification rule subsets in the SPSR group. For example, for each of a plurality of leaf nodes that are SPSR to each other, an identifier of a SPSR group to which a classification rule subset corresponding to the leaf node belongs and an index of the classification rule subset in the SPSR group are stored in the leaf node.

Based on the above example, for a leaf node with a classification rule subset as {r0, r1, r2}, a mapping relationship among the leaf node, the identifier spsrg1 of the SPSR group to which the classification rule subset {r0, r1, r2} belongs, and the index 0 of the classification rule subset {r0, r1, r2} in the SPSR group may be established. The identifier spsrg1 of the SPSR group to which the classification rule subset {r0, r1, r2} belongs and the index 0 of the classification rule subset {r0, r1, r2} in the SPSR group spsrg1 may be stored in the leaf node.

The network device may combine template dimension decision trees respectively corresponding to a plurality of classification rule subsets in a same SPSR group into one template dimension decision tree and each leaf node of the template dimension decision tree obtained by combination may include a classification rule subset corresponding to each index in the SPSR group.

In an example of the present disclosure, template dimension decision trees respectively corresponding to a plurality of classification rule subsets that are SPSR to each other are same in structure except for leaf nodes. In this way, when a plurality of leaf nodes that are SPSR to each other exist among the leaf nodes of a non-template dimension decision tree, each leaf node of a template dimension decision tree corresponding to each of the leaf nodes that are SPSR to each other includes a plurality of classification rules obtained by performing instantiation by applying a same template item to different non-template dimensions, and only the classification rule with highest priority in the plurality of classification rules may become valid. Thus, for leaf nodes including a plurality of classification rule subsets that are SPSR to each other in the leaf nodes of the non-template dimension decision tree, the network device may delete classification rule subsets with lower priority included in the leaf nodes.

In an example of the present disclosure, the network device may build a decision tree (formed by a non-template dimension decision tree and a template dimension decision tree) corresponding to a classification rule set. Then, when receiving a packet to be classified, the network device may firstly query the non-template dimension decision tree corresponding to the classification rule set based on the packet, so as to determine a leaf node (referred to as a first target leaf node) corresponding to the packet in the non-template dimension decision tree. And the network device may obtain an identifier of an SPSR group (referred to as a target SPSR group) and an index (referred to as a target index) of the classification rule subset (referred to as a target classification rule subset) in the target SPSR group stored in the first target leaf node.

Afterwards, the network device may query a template dimension decision tree (referred to as a target template dimension decision tree) corresponding to the target SPSR group based on the packet to be classified, so as to determine a leaf node (referred to as a second target leaf node) corresponding to the packet to be classified in the target template dimension decision tree.

Finally, the network device may determine a classification rule that corresponds to the target index and is included in the second target leaf node as a classification rule matching the packet to be classified.

To allow persons skilled in the art to better understand the technical solutions of the examples of the present disclosure, the technical solutions of the examples of the present disclosure will be described in combination with specific examples.

Figure 2A:
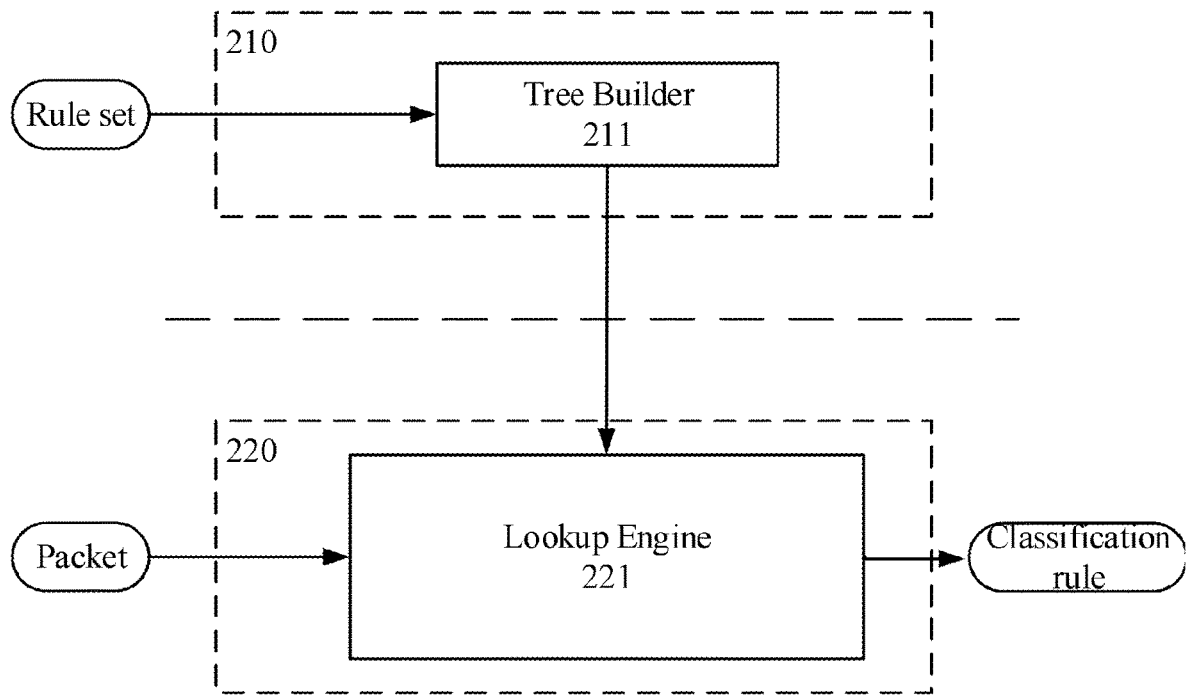
FIG. 2A is a schematic diagram illustrating a structure of a packet classification principle according to an example of the present disclosure.

FIG. 2A is a schematic diagram illustrating a structure of a packet classification principle according to an example of the present disclosure. As shown in FIG. 2A, a Center Process Unit 210 (CPU) compiles an input classification rule set as a decision tree by a Tree Builder 211 and distributes the decision tree to Field Programmable Gate Array 220 (FPGA). When receiving a packet, FPGA 220 queries the decision tree corresponding to a classification rule set by a Lookup Engine 221 to determine a matched classification rule.

Figure 2B:
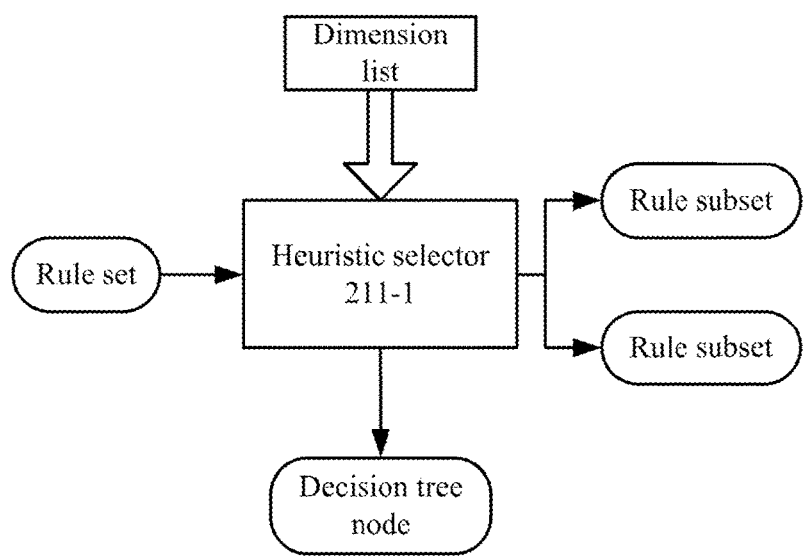
FIG. 2B is a schematic diagram illustrating a principle of an iterating unit of a tree builder according to an example of the present disclosure

The tree builder 211 may complete building of the decision tree by iteration and its core is one heuristic selector 211-1 based on dimension and value (D&V). One rule set (RS) is input into this heuristic selector and two rule subsets and one decision tree node (DT node) are output from the heuristic selector. The heuristic selector selects one dimension and value from an input dimension list (Dim List) based on a heuristic algorithm according to the input rule set and then divides the input rule set into two subsets based on the selected dimension and value. If a value range of a dimension corresponding to a rule is smaller than the selected value, the rule is divided into a left subset; if a value range of a dimension corresponding to a rule is equal to or greater than the selected value, the rule is divided into a right subset; if a value range of a dimension corresponding to a rule covers the selected value, the rule is divided into two, a part less than the selected value is divided into the left subset and a part equal to or greater than the selected value is divided into the right subset. In this way, one space division is completed for a rule set by using the selected dimension and value as one decision tree node. At the same time, the above operations are continued iteratively for the obtained two rule subsets until the classification rule subsets cannot be further divided. A schematic diagram illustrating a principle of an iterating unit in the tree builder 211 is shown in FIG. 2B.

Based on FIGS. 2A and 2B, an implementation flow of a solution of building a decision tree of packet classification according to an example of the present disclosure may be as follows:

The classification rule template shown in Table 2 and the classification rule set shown in Table 1 are taken as an example. The non-template dimensions of the classification rule set include vlan and sysport, and the template dimensions include sip, dip, sport, dport and prot.

A non-template dimension decision tree corresponding to the classification rule set shown in Table 1 may be obtained by performing tree building for the classification rule set based on the non-template dimensions vlan and sysport. The structural schematic diagram of the non-template dimension decision tree may be shown in FIG. 3A.

Figure 3A:
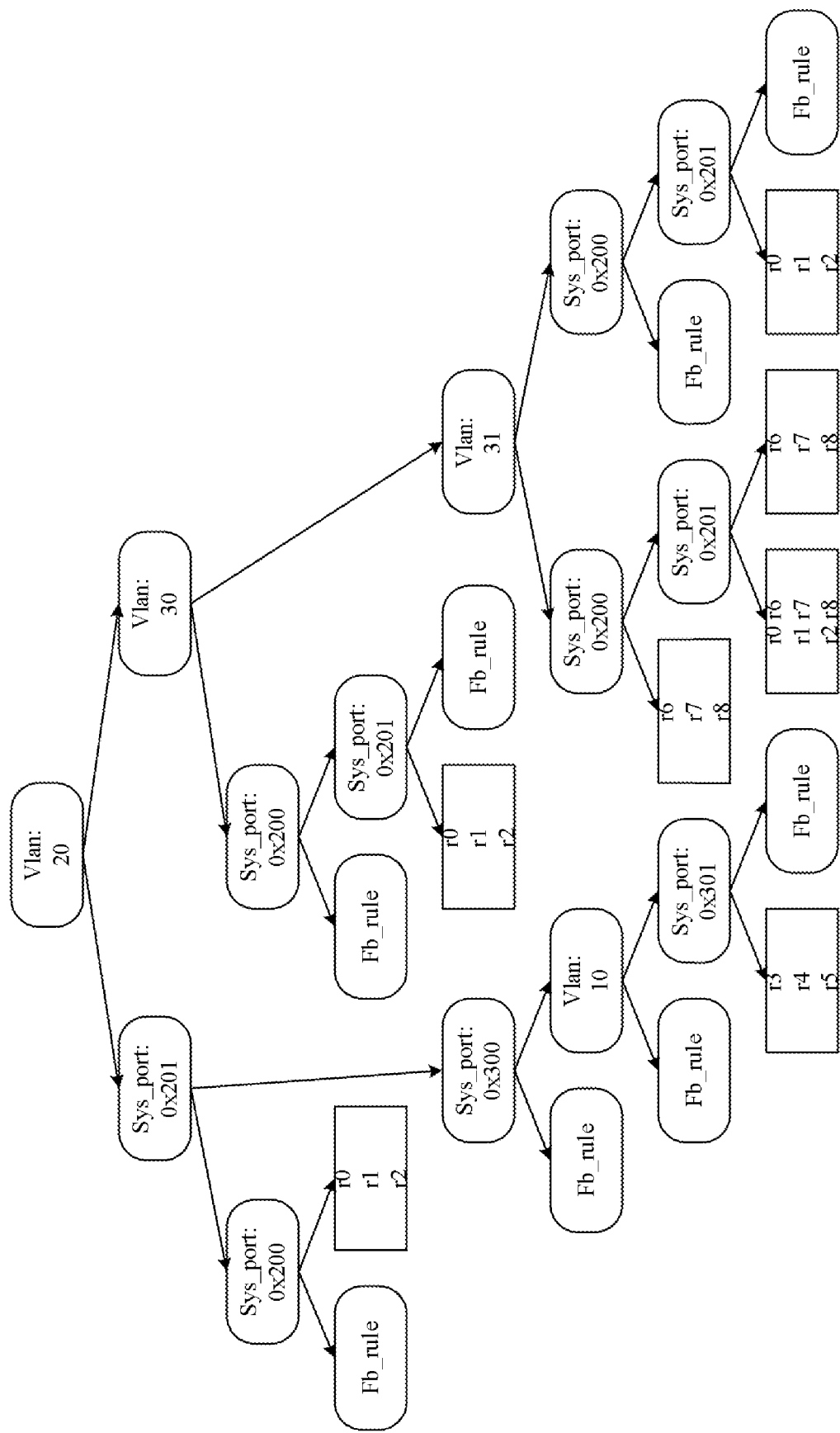
FIG. 3A-FIG. 3E are schematic diagrams illustrating a decision tree according to an example of the present disclosure.

In the leaf nodes of the non-template dimension decision tree shown in FIG. 3A, each of the leaf nodes with a non-rectangular box includes only one hole-filling rule and each of the leaf nodes with a rectangular box includes a plurality of classification rules.

A template dimension decision tree corresponding to each leaf node of the non-template dimension decision tree may be obtained by performing tree building for each leaf node of the non-template dimension decision tree shown in FIG. 3A based on the template dimensions sip, dip, sport, dport and prot.

A template dimension decision tree obtained by performing tree building for a leaf node including only one hole-filling rule based on template dimensions includes only one node and the node includes only the hole-filling rule.

Figure 3B:
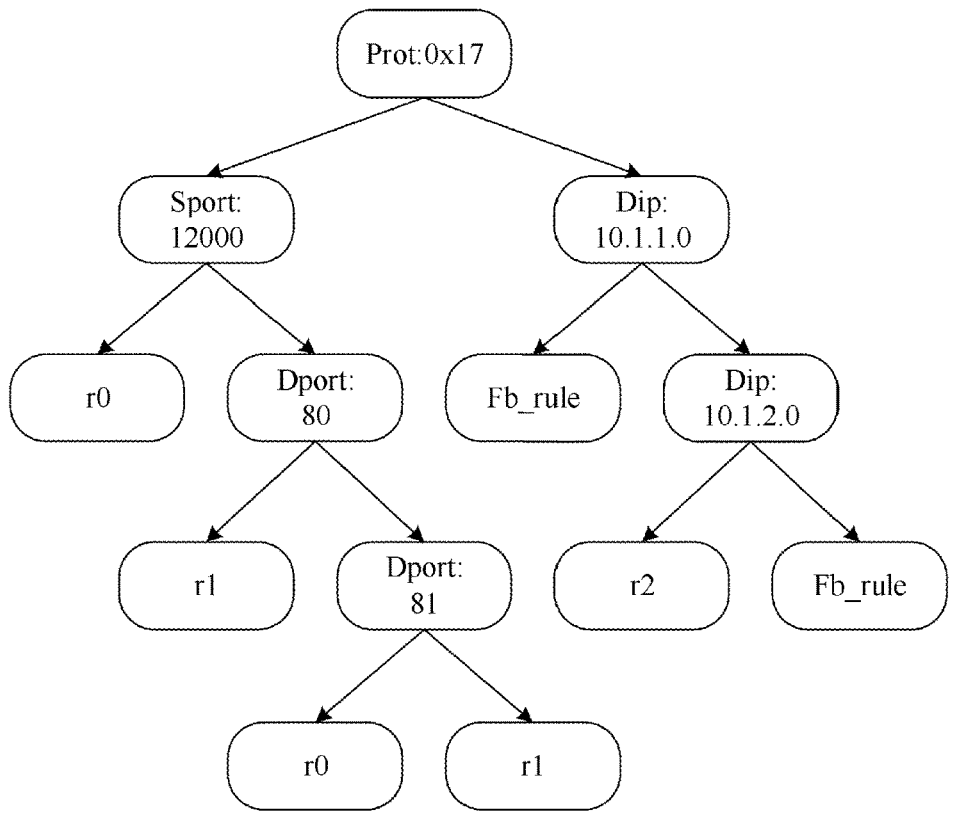

For a leaf node including the classification rules r0, r1 and r2, a schematic diagram of a template dimension decision tree obtained by performing tree building for the leaf node based on template dimensions may be shown in FIG. 3B.

Figure 3C:
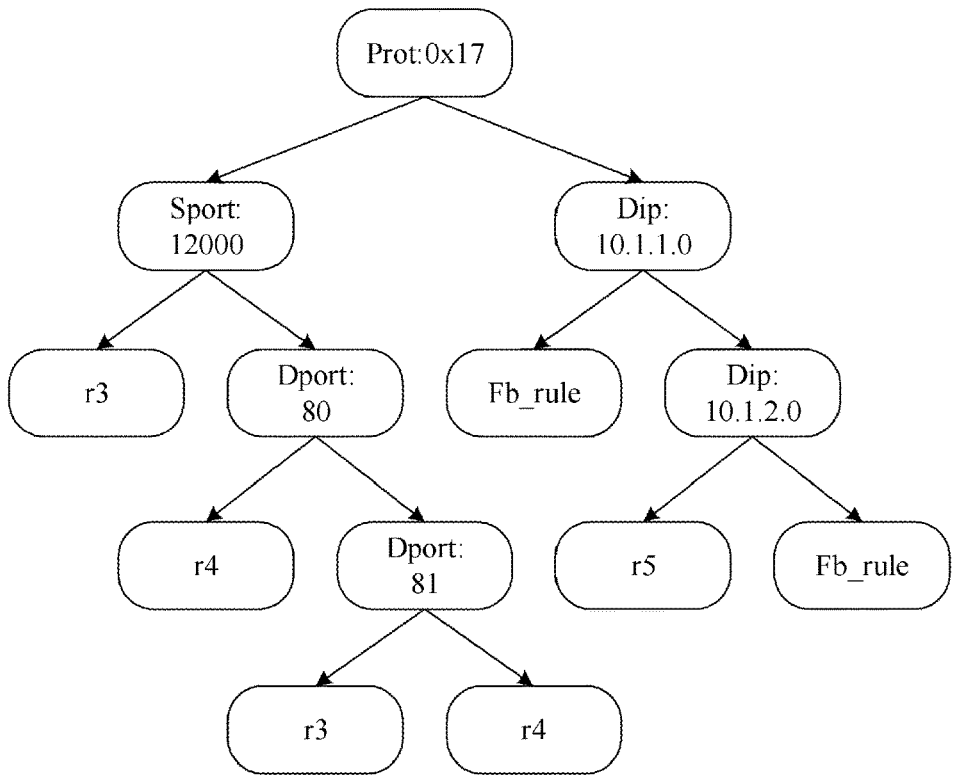

For a leaf node including the classification rules r3, r4 and r5, a schematic diagram of a template dimension decision tree obtained by performing tree building for the leaf node based on template dimensions may be shown in FIG. 3C.

As can be seen from FIGS. 3B and 3C, the classification rule subset {r0, r1, r2} is obtained by performing instantiation by applying the classification rule template shown in Table 2 to the non-template dimension sysport=0x200, the classification rule subset {r3, r4, r5} is obtained by performing instantiation by applying the classification rule template shown in Table 2 to the non-template dimensions sysport=0x300 and vlan=[10, 20) and the classification rule subsets {r0, r1, r2} and {r3, r4, r5} are SPSR to each other. Thus, template dimension decision trees with respect to the classification rule subsets {r0, r1, r2} and {r3, r4, r5} are same in tree structure except for leaf nodes. Leaf nodes at a same position in the template dimension decision trees shown in FIGS. 3B and 3C are classification rules obtained by performing instantiation by applying a same template item to different non-template dimensions respectively.

Similarly, since the classification rule subset {r6, r7, r8} is obtained by applying the classification rule template shown in a same Table 2 to the non-template dimension vlan=30, tree structure of a template dimension decision tree corresponding to the leaf node including the classification rules r6, r7 and r8 is same as those of the template dimension decision trees shown in FIG. 3B and FIG. 3C and the leaf nodes at a same position are also obtained by same template item instantiation.

It is noted that for the leaf node including the classification rules r0, r1, r2, r6, r7 and r8 in the non-template dimension decision tree shown in FIG. 3A, by performing tree building for the leaf node based on the template dimension, a template dimension decision tree may be obtained. Since the classification rule subsets {r0, r1, r2} and {r6, r7, r8} are SPSR to each other, each leaf node in the obtained template dimension decision tree not including the hole-filling rule includes two classification rules, and the two classification rules are obtained by performing instantiation by applying a same template item to different non-template dimensions. Specifically, the classification rules r0 and r6 are obtained by performing instantiation by applying the template item me0 in table 2 to different non-template dimensions, and the classification rules r1 and r7 are obtained by performing instantiation by applying the template item me1 in table 2 to different non-template dimensions and the classification rules r5 and r8 are obtained by performing instantiation by applying the template item me2 in table 2 to different non-template dimensions. When a packet is matched with a leaf node including a plurality of classification rules, a returned matching result is a classification rule with higher priority. Therefore, for a leaf node including a plurality of classification rule subsets that are SPSR to each other, it is only desired to retain a classification rule subset with higher priority among the plurality of classification rule subsets that are SPSR to each other, and filter out a classification rule subset with lower priority, that is, only retain the classification rule subset {r0, r1, r2} and delete the classification rule subset {r6, r7, r8}. Further, the structural schematic diagram of the template dimension decision tree corresponding to the leaf node may also be shown in FIG. 3B.

In addition, assume that an identifier of an SPSR group corresponding to the hole-filling rule is spsrg0, an index of the hole-filling rule in the SPSR group spsrg0 is 0; an identifier of an SPSR group corresponding to the classification rule subsets {r0, r1, r2}, {r3, r4, r5} and {r6, r7, r8} is spsrg1 and the indexes of the classification rule subsets {r0, r1, r2}, {r3, r4, r5} and {r6, r7, r8} in the SPSR group spsrg1 is 0, 1, and 2 respectively.

Figure 3D:
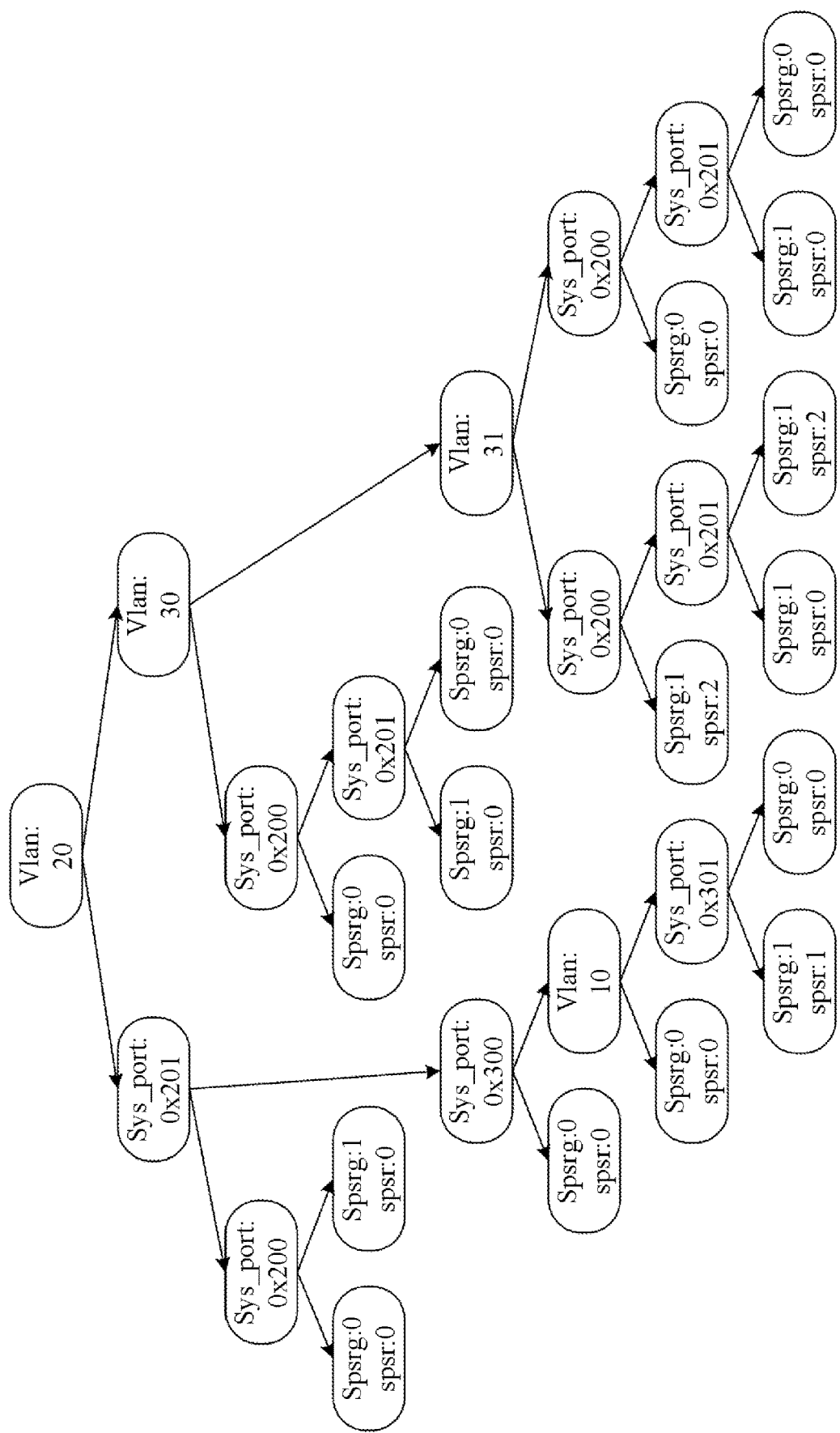

For each of a plurality of leaf nodes that are SPSR to each other in the non-template dimension decision tree shown in FIG. 3A, a mapping relationship among the leaf node, the identifier of the SPSR group to which the classification rule subset corresponding to the leaf node belongs and the index of the classification rule subset in the SPSR group is established. The schematic diagram of the processed non-template dimension decision tree may be shown in FIG. 3D.

Template dimension decision trees respectively corresponding to a plurality of leaf nodes that are SPSR to each other may be combined into a same template dimension decision tree. The leaf node of the template dimension decision tree obtained by combination includes classification rules respectively corresponding to the indexes in the SPSR group.

Since the SPSR group corresponding to the hole-filling rule includes only one classification rule, i.e. the hole-filling rule, the template dimension decision tree corresponding to the hole-filling rule includes only one leaf node and the hole-filling rule may be directly recorded in the leaf node.

Figure 3E:
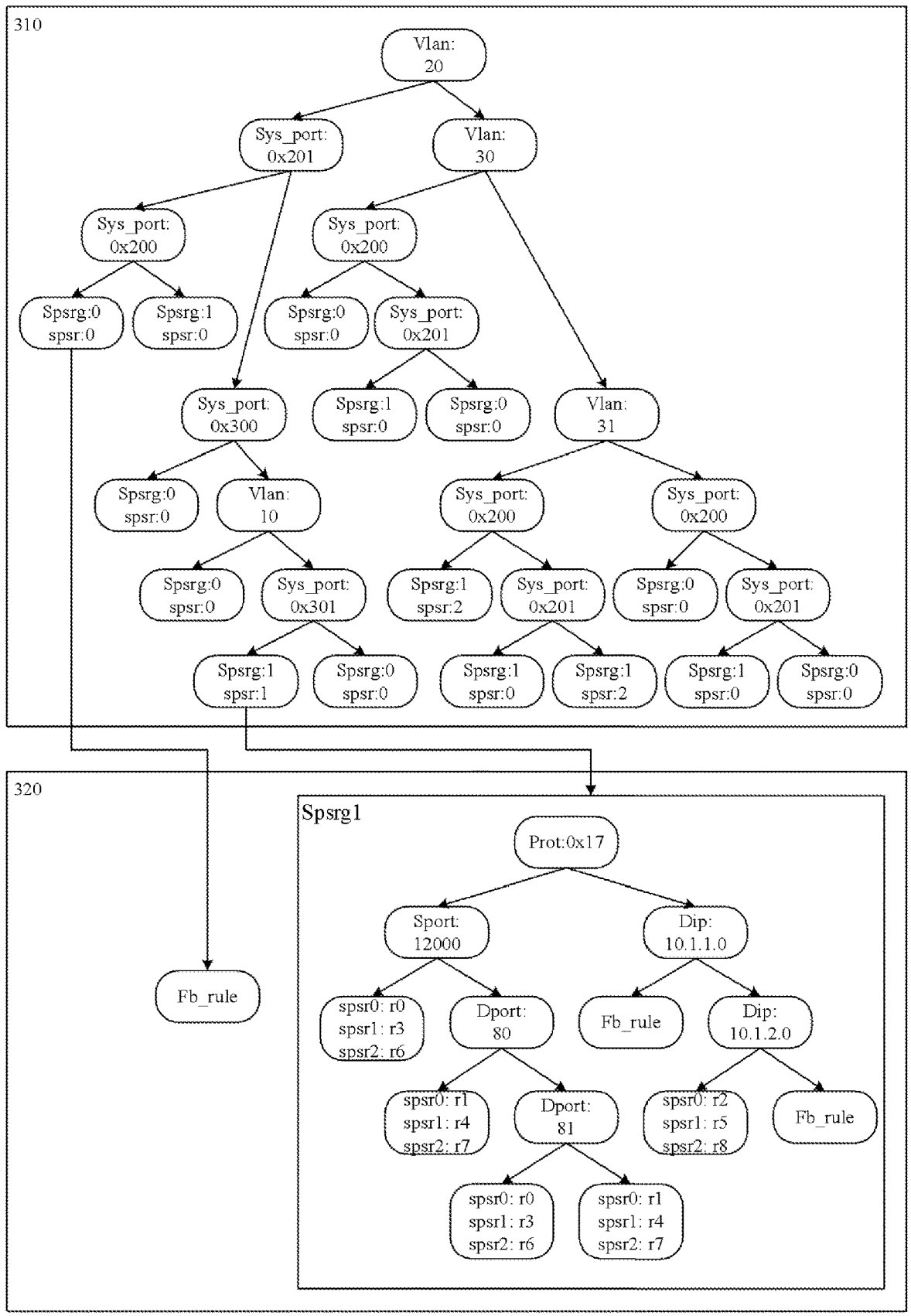

A structure of a finally-generated decision tree corresponding to the classification rule set shown in Table 1 may be shown in FIG. 3E, including a non-template dimension decision tree 310 and a template dimension decision tree 320.

A specific flow of packet classification will be briefly described below in combination with specific examples.

In this example, it is assumed that values of different fields in a packet 1 and a packet 2 are shown in Table 3.

TABLE 3

| | sip | dip | sport | dport | prot | vlan | sysport |
|---|---|---|---|---|---|---|---|
| Packet 1 | 1.1.1.1 | 10.1.1.10 | 12000 | 12000 | udp | 10 | 0x200 |
| Packet 2 | 1.1.1.1 | 10.1.1.10 | 12000 | 80 | tcp | 30 | 0x100 |

Figure 4:
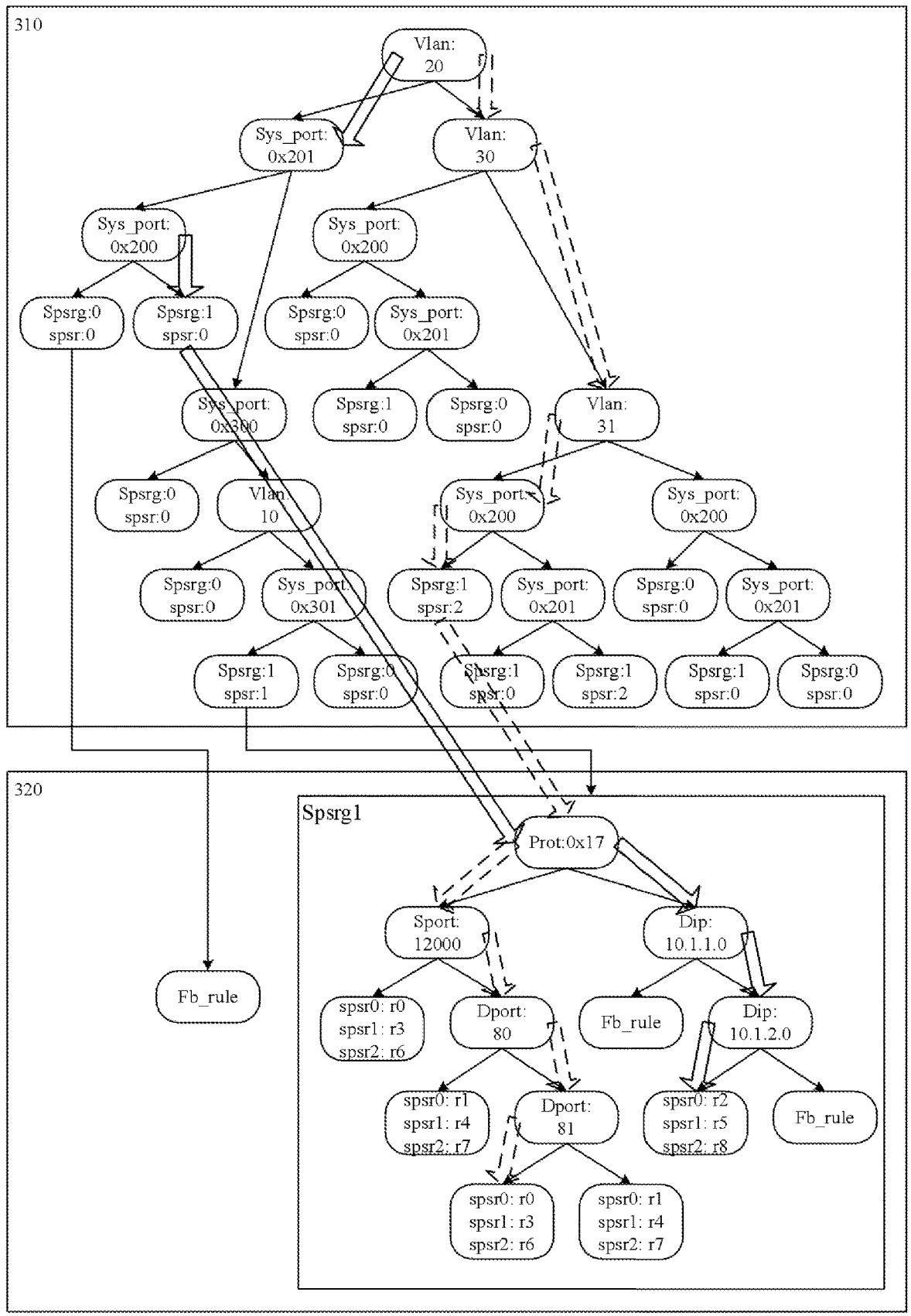
FIG. 4 is a schematic diagram illustrating a querying path for packet classification according to an example of the present disclosure.

A querying path of the packet 1 may be shown by solid-line double arrows in FIG. 4. A leaf node hit by the packet 1 in the template dimension decision tree 320 includes three classification rules r2, r5, and r8. However, since an index in a leaf node that is passed through by the packet 1 in the non-template dimension decision tree 310 is 0 (spsr:0 as shown), the classification rule r2 will be finally hit by the packet 1.

A querying path of the packet 2 may be shown by dotted-line double arrows in FIG. 4. A leaf node hit by the packet 2 in the template dimension decision tree 320 includes three classification rules r0, r3 and r6. However, since an index in a leaf node that is passed through by the packet 2 in the non-template dimension decision tree 310 is 2 (spsr:2 as shown), the packet 2 finally hits the classification rule r6.

As can be seen from the above descriptions, in the technical solutions of the examples of the present disclosure, the first type decision tree is generated by performing tree building for a classification rule set based on non-template dimensions of the classification rule set and the second type decision tree is generated by performing tree building for each leaf node of the first type decision tree based on template dimensions of the classification rule set, so that a plurality of leaf nodes that are SPSR to each other in the first type decision tree associate with a same second type decision tree, thereby effectively reducing repeated tree building of template dimensions and scale of decision tree, and further increasing the scale of supported classification rule set and improving a utilization rate of storage space and processing capability of packet classification of a network device.

The above are descriptions about a method provided in an example of the present disclosure. Descriptions are made below for an apparatus provided in an example of the present disclosure.

Figure 5:
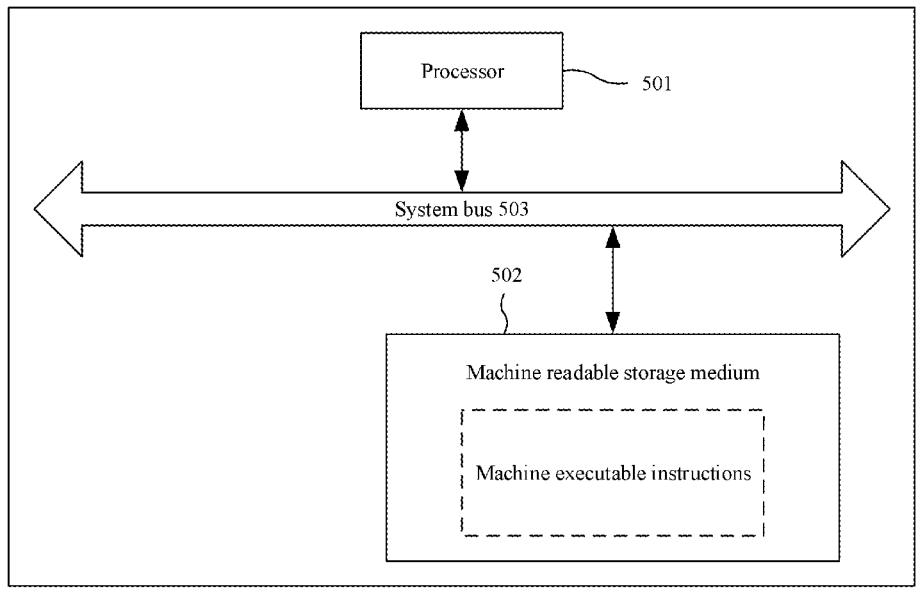
FIG. 5 is a schematic diagram illustrating a hardware structure of an apparatus for building a decision tree for packet classification according to an example of the present disclosure.

FIG. 5 is a schematic diagram illustrating a hardware structure of an apparatus for building a decision tree for packet classification according to an example of the present disclosure. The apparatus for building a decision tree for packet classification may include a processor 501, and a machine-readable storage medium 502 storing machine executable instructions. The processor 501 communicates with the machine-readable storage medium 502 via a system bus 503. Also, the processor 501 may execute the above method of building a decision tree for packet classification by reading and executing machine executable instructions corresponding to a control logic for building a decision tree for packet classification and stored on the machine-readable storage medium 502.

The machine-readable storage medium 502 mentioned herein may be any of electronic, magnetic, optical or other physical storage devices and may contain or store information such as executable instructions, data and so on. For example, the machine-readable storage medium may be a volatile memory, a non-volatile memory or a similar storage medium. Specifically, the machine-readable storage medium may be a Random Access Memory (RAM), a flash memory, a storage drive (e.g. hard disk drive), a solid state hard disk, any type of storage disk (e.g., optical disk), or a combination thereof.

In an example, the apparatus for building a decision tree for packet classification may further include a Field Programmable Gate Array (FPGA) (not shown). Correspondingly, after completing building of a decision tree, the processor 501 may distribute the decision tree to the FPGA for querying the decision tree.

Figure 6:
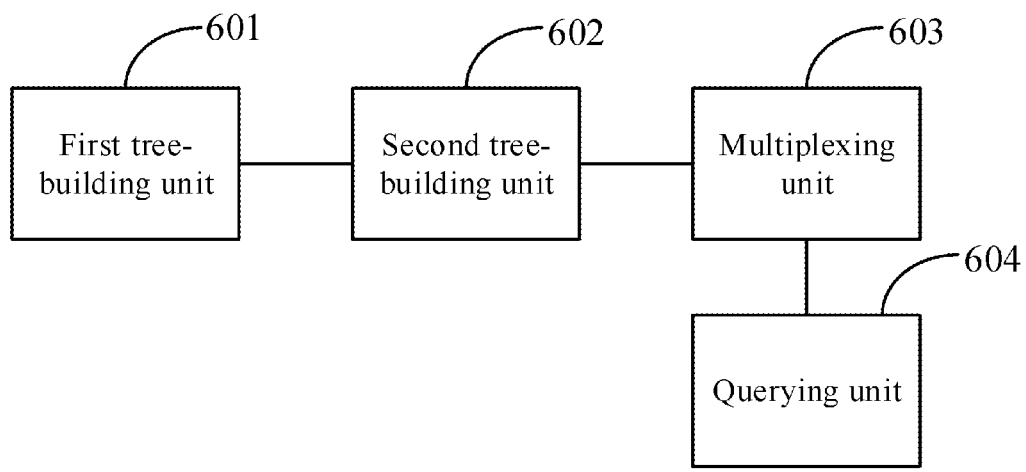
FIG. 6 is a structural schematic diagram illustrating functions of a control logic for building a decision tree for packet classification according to an example of the present disclosure.

As shown in FIG. 6, functionally divided, a control logic for building a decision tree for packet classification may include a first tree-building unit 601, a second tree-building unit 602 and a multiplexing unit 603.

The first tree-building unit 601 is configured to generate a first type decision tree by performing tree building for a classification rule set based on a non-template dimension of the classification rule set, where the first type decision tree is a non-template dimension decision tree corresponding to the classification rule set.

The second tree-building unit 602 is configured to generate a second type decision tree by performing tree building for each leaf node of the first type decision tree based on a template dimension of the classification rule set, where the second type decision tree is a template dimension decision tree corresponding to the leaf node of the first type decision tree.

The multiplexing unit 603 is configured to associate a plurality of leaf nodes that are Same Pattern Sub Ruleset (SPSR) to each other in the first type decision tree with a same second type decision tree, where classification rules sets included in the plurality of leaf nodes that are SPSR to each other are SPSR to each other.

The first tree-building unit 601 is further configured to set a classification rule which is included in a leaf node having no classification rule matched, as a hole-filling rule when no classification rule in the classification rule set is matched based on the non-template dimension and a value of the non-template dimension, where the hole-filling rule is lower in priority than all classification rules in the classification rule set.

The second tree-building unit 602 is further configured to delete a classification rule subset with lower priority in leaf nodes including a plurality of classification rule subsets that are SPSR to each other when the leaf nodes exist in the first type decision tree.

The multiplexing unit 603 is further configured to divide the plurality of classification rule subsets that are SPSR to each other into a same SPSR group; establish a mapping relationship among each of a plurality of leaf nodes that are SPSR to each other in the first type decision tree, an identifier of a SPSR group to which a corresponding classification rule subset belongs and an index of the classification rule subset in the SPSR group; combine second type decision trees corresponding to a plurality of leaf nodes that are SPSR to each other in the first type decision tree into a same second type decision tree, where the leaf node of the second type decision tree obtained by combination includes a classification rule corresponding to each index in the SPSR group.

The control logic for building a decision tree for packet classification as above may further include a querying unit 604 configured to query the first type decision tree corresponding to the classification rule set based on a packet to be classified when receiving the packet to be classified to determine a first target leaf node corresponding to the packet to be classified in the first type decision tree; determine a target second type decision tree based on an identifier of an SPSR group stored in the first target leaf node and query the target second type decision tree based on the packet to be classified to determine a second target leaf node corresponding to the packet to be classified in the second type decision tree; search the second target leaf node for a corresponding classification rule based on an index in the SPSR group which is stored in the first target leaf node and determine the classification rule as a classification rule matching the packet to be classified.

It shall be noted that the terms such as "first" and "second" used herein are merely intended to distinguish one entity or operation from another entity or operation rather than to require or imply any such actual relation or order existing between these entities or operations. Also, the term "including", "containing" or any variation thereof is intended to encompass non-exclusive inclusion, so that a process, method, article or device including a series of elements includes not only those elements but also other elements not listed explicitly or those elements inherent to such a process, method, article or device. Without more limitations, an element defined by the statement "including a . . . " shall not be precluded to include additional same elements present in a process, method, article or device including the elements.

The foregoing disclosure is merely illustrative of preferred examples of the present disclosure but not intended to limit the present disclosure, and any modifications, equivalent substitutions, adaptations thereof made within the spirit and principles of the disclosure shall be encompassed in the scope of protection of the present disclosure.

The invention claimed is:

1. A method of building a decision tree for packet classification, comprising:
   generating a first type decision tree by performing tree building for a classification rule set based on a non-template dimension of the classification rule set;
   generating a second type decision tree by performing tree building for each leaf node in the first type decision tree based on a template dimension of the classification rule set; and
   associating a plurality of leaf nodes that are Same Pattern Sub Ruleset (SPSR) to each other in the first type decision tree with a same second type decision tree, wherein the plurality of leaf nodes that are SPSR to each other indicate that classification rule sets respectively included in the plurality of leaf nodes are SPSR to each other.

2. The method according to claim 1, wherein performing tree building for the classification rule set based on the non-template dimension comprises:
   when no classification rule in the classification rule set is matched based on the non-template dimension and a value of the non-template dimension,
   setting a classification rule which is included in a leaf node with no classification rule being matched, as a hole-filling rule;
   wherein, the hole-filling rule is lower in priority than classification rules in the classification rule set.

3. The method according to claim 1, further comprising:
   when leaf nodes including a plurality of classification rule subsets that are SPSR to each other exist in the first type decision tree,
   deleting a classification rule subset with lower priority in the leaf nodes.

4. The method according to claim 1, wherein associating a plurality of leaf nodes that are SPSR to each other in the first type decision tree with a same second type decision tree comprises:
   dividing a plurality of classification rule subsets that are SPSR to each other in the plurality of leaf nodes to a same SPSR group;
   for each of the plurality of leaf nodes, establishing a mapping relationship among the leaf node, an identifier of the SPSR group and an index of the classification rule subset included in the leaf node in the SPSR group; and
   combining second type decision trees respectively corresponding to the plurality of leaf nodes into one second type decision tree, wherein a leaf node of the combined second type decision tree includes classification rules in the SPSR group.

5. The method according to claim 4, further comprising:
   determining a first target leaf node corresponding to a packet to be classified in the first type decision tree by querying the first type decision tree;
   determining a target second type decision tree based on an identifier of a SPSR group stored in the first target leaf node;
   determining a second target leaf node corresponding to the packet to be classified in the target second type decision tree by querying the target second type decision tree;
   searching the second target leaf node for a classification rule based on an index in the SPSR group which is stored in the first target leaf node; and
   determining the searched classification rule as a classification rule matching the packet to be classified.

6. An apparatus for building a decision tree for packet classification, comprising:
   a processor and
   a machine-readable storage medium storing machine executable instructions executable by the processor, wherein the processor is caused by the machine executable instructions to:
   generate a first type decision tree by performing tree building for a classification rule set based on a non-template dimension of the classification rule set;
   generate a second type decision tree by performing tree building for each leaf node in the first type decision tree based on a template dimension of the classification rule set;
   associate a plurality of leaf nodes that are Same Pattern Sub Ruleset (SPSR) to each other in the first type decision tree with a same second type decision tree, wherein the plurality of leaf nodes that are SPSR to each other indicate that classification rule sets respectively included in the plurality of leaf nodes are SPSR to each other.

7. The apparatus according to claim 6, wherein the processor is further caused by the machine executable instructions to:
   when no classification rule in the classification rule set is matched based on the non-template dimension and a value of the non-template dimension,
   set a classification rule which is included in a leaf node with no classification rule being matched, as a hole-filling rule;
   wherein, the hole-filling rule is lower in priority than classification rules in the classification rule set.

8. The apparatus according to claim 6, wherein the processor is further caused by the machine executable instructions to:
   when leaf nodes including a plurality of classification rule subsets that are SPSR to each other exist in the first type decision tree,
   delete a classification rule subset with lower priority in the leaf nodes.

9. The apparatus according to claim 6, wherein the processor is further caused by the machine executable instructions to:
   divide a plurality of classification rule subsets that are SPSR to each other in the plurality of leaf nodes to a same SPSR group;
   for each of the plurality of leaf nodes, establish a mapping relationship among the leaf node, an identifier of the SPSR group and an index of the classification rule subset included in the leaf node in the SPSR group; and
   combine second type decision trees respectively corresponding to the plurality of leaf nodes into one second type decision tree, wherein a leaf node of the combined second type decision tree includes classification rules in the SPSR group.

10. The apparatus according to claim 9, wherein the processor is further caused by the machine executable instructions to:
    determine a first target leaf node corresponding to a packet to be classified in the first type decision tree by querying the first type decision tree;

determine a target second type decision tree based on the identifier of a SPSR group stored in the first target leaf node;

determine a second target leaf node corresponding to the packet to be classified in the target second type decision tree by querying the target second type decision tree;

search the second target leaf node for a classification rule in based on an index in the SPSR group which is stored in the first target leaf node; and determine the searched classification rule as a classification rule matching the packet to be classified.

11. The apparatus according to claim 10, wherein, the apparatus further includes a Field Programmable Gate Array (FPGA); and the processor is further caused by the machine executable instructions to:

distribute the first type decision tree and the second type decision tree to the FPGA so that the FPGA performs decision tree query.

\* \* \* \* \*